United States Patent [19]

Livermore et al.

[11] Patent Number: 4,626,950
[45] Date of Patent: Dec. 2, 1986

[54] REMOVAL OF REEL STORED MAGNETIC TAPE

[75] Inventors: Anthony W. Livermore, Woburn; Francis J. Ford, Melrose, both of Mass.

[73] Assignee: Dennison Manufacturing Company, Framingham, Mass.

[21] Appl. No.: 650,752

[22] Filed: Sep. 13, 1984

[51] Int. Cl.⁴ .............................................. G11B 5/78
[52] U.S. Cl. .................................. 360/134; 360/137; 242/72 R
[58] Field of Search ............... 360/134, 131, 132, 137; 242/197–198, 71.8, 71, 68.2, 72.1, 82 R, 72 B

[56] References Cited

U.S. PATENT DOCUMENTS

| | | | |
|---|---|---|---|
| 2,041,152 | 5/1936 | Scubin | 242/72 |
| 2,659,542 | 11/1953 | Steuber | 242/72 |
| 2,868,473 | 1/1959 | Hoisington | 242/72 |
| 3,132,821 | 5/1964 | Herden | 242/71.8 |
| 3,779,476 | 12/1973 | Hofbauer | 242/72 X |

Primary Examiner—A. J. Heinz
Attorney, Agent, or Firm—George E. Kersey

[57] ABSTRACT

Apparatus for removing all or part of a roll of magnetic tape stored on a reel of a reel-to-reel tape transport device. This apparatus consists of a stripper reel which is structurally compatible with a reel mounting hub of the transport device. The stripper reel includes a hard circular "reel core" mounted to the hub and supporting front and back flanges, as well as a resilient annular "tape core" fitted around the reel core. Typically, the tape core consists of a hollow circular cylinder of elastomeric material, having a durometer between 10 and 30. The user winds a segment of tape to be discarded from the unwind reel onto the tape core of the stripping device, removes the front flange, and manually removes the tape pack from the stripper reel.

11 Claims, 2 Drawing Figures

REMOVAL OF REEL STORED MAGNETIC TAPE

BACKGROUND OF THE INVENTION

The present invention relates to reel-to-reel tape transports, and more particularly to the storage and handling of magnetic tape.

One of the predominant formats for magnetic tape recording and playback devices is the reel-to-reel system. In such devices, tape is stored on a reel including a circular cylindrical core structure onto which the tape is wrapped. The tape includes a base material, which takes the form of a thin web of polyester or like composition, combining the characteristics of limpness and high tensile strength. This base is coated with a layer of magnetic particles dispersed in a suitable binder.

Magnetic recording has been applied to a wide array of applications, many of which impose demanding requirements as to the quality of manufactured tape, and in regard to maintaining tape integrity during use and storage. For example, computer tapes are subject to rigorous specifications as to avoidance of "dropouts", or errors in the recording medium. These tapes, and the transport apparatus, must be designed to permit rapid shuttling of the tape without significant mechanical defect. Instrumentation tapes and their transport systems also undergo rigorous testing for mechanical and electromagnetic defects, as do video tapes.

Magnetic tape base materials are vulnerable to various types of mechanical defect. Common shortcomings are "cupping", which imparts an undesirable stiffness to the tape due to nonuniformities in the base film; "curling", which is manifested in a tendency of free hanging tape to twist; and layer-to-layer adhesion. These defects may result from improper manufacture, or from problems in storing or handling the tape. The user may also encounter an uneven "pack" or winding of the tape, such as a local protrusion of certain layers of the tape, which may lead to nicked or torn edges. "Cinching" is likely to occur in a loosely-packed tape, and refers to a tangential slippage between layers which in extreme cases can cause folding or creasing of the tape.

It is often necessary or desirable for the user to discard a portion of the magnetic tape wound upon a reel, because of mechanical defects such as those discussed above, defects in the magnetic coating, or for other reasons. In some cases it is even desirable to discard an entire roll of tape wound upon an expensive reel, while saving the reel for later use. In such instances, it is desirable to employ some device for efficiently stripping the tape section from the reel, and discarding the tape. Prior art devices for this purpose have featured elaborate and cumbersome techniques.

Accordingly, it is a principal object of the invention to provide apparatus for stripping magnetic tape from reels efficiently and reliably. Desirably such apparatus should be simple in construction and use.

Another object is to achieve a device for this purpose which is compatible with a variety of types of recording tape and reel dimensions. As a related object, such a device should be adaptable to a variety of reel-to-reel magnetic tape applications.

Still another object is to provide inexpensive, easily manufactured apparatus of this nature. Desirably, such apparatus should be routinely adaptable to the specifications of given reel-to-reel tape transport systems.

A further object in the invention is that such a device be reusable.

SUMMARY OF THE INVENTION

The above and related objects are satisfied by tape stripping apparatus of the present invention. The stripper device includes a hard central "tape core", which may be identical in dimension and construction to the core of a normal reel—i.e. compatible with the reel mounting assembly of the tape transport. A relatively resilient, annular "tape core" is placed around the ree core, so that tape is wound around the tape core rather than the reel core. Front and back flanges, essentially similar to those of an unwind reel, complete this structure.

One aspect of the invention relates to the composition of the tape core. This core should consist of an elastomeric material which is sufficiently yielding to provide the requisite "give" upon receiving the tape pack, yet durable enough to withstand the packing forces without deterioration. Applicants have generally observed that a hardness of between 10–30 durometer, and most advantageously between 10–20 durometer, is suitable for this material. Illustrative materials satisfying these requirements include certain silicone elastomers, urethanes, and fluorocarbons.

A further aspect of the invention is the dimensions of the tape core. The most critical dimension is the radial thickness of the core, which should be sufficient to allow a compressive deformation which facilitates tape release. Secondarily, the core should not be so thick as to leave insufficient room for stacking desired quantities of tape on the reel.

In use, this stripper reel is mounted in place of a normal takeup reel, and a segment of tape to be discarded is wound thereupon and severed from any tape to be saved. The user removes the front flange of the stripper reel, manually grasps the tape, and easily pulls the tape off the resilient tape core. The invention overcomes the problem of high-order packing forces which have frustrated prior art tape stripping approaches.

BRIEF DESCRIPTION OF THE DRAWINGS

The above and additional aspects of the invention are illustrated in the following detailed description of the preferred embodiment, which should be taken in conjunction with the drawings in which.

DETAILED DESCRIPTION

Figure 1:
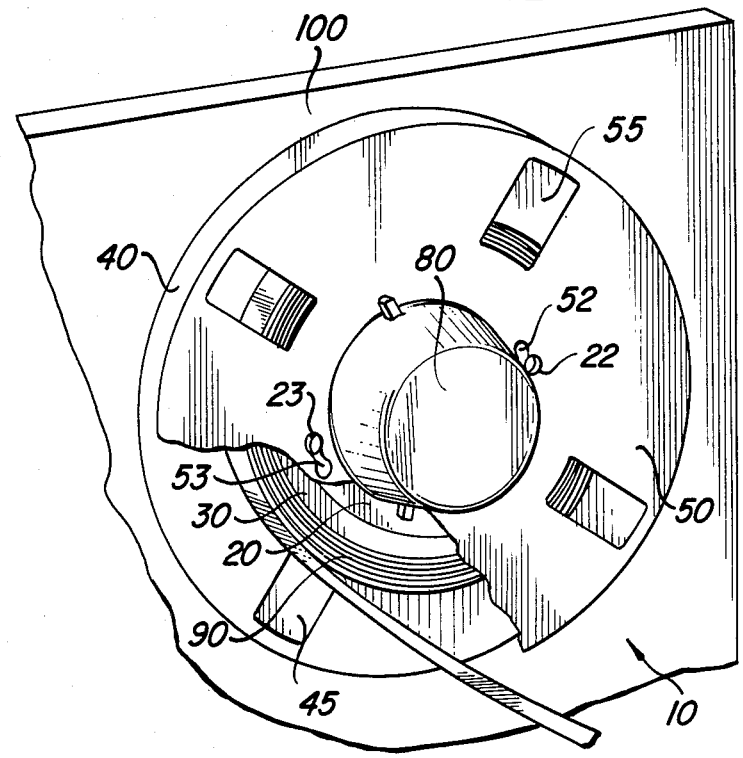
FIG. 1 is a partially cut-away perspective view of a tape stripping reel in accordance with the preferred embodiment, mounted on a tape deck.
Figure 2:
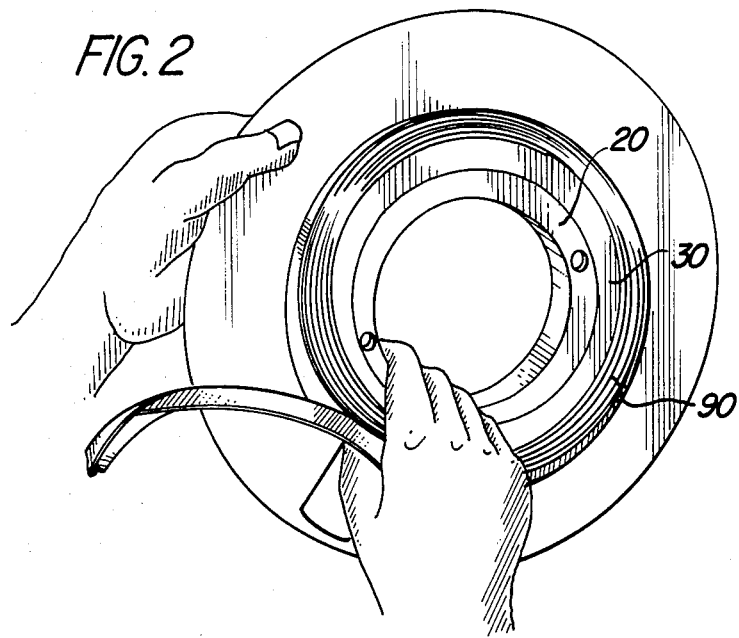
FIG. 2 is a perspective view of the tape stripping reel of FIG. 1, showing the removal of a tape pack therefrom.

FIGS. 1 and 2 illustrate a tape stripping assembly 10 in a preferred embodiment of the invention. As shown in FIG. 1, the tape stripper 10 is similar in general construction to one of the reels of a reel-to-reel tape deck 100. The stripper reel 10 is shown mounted to the takeup reel hub 80 of tape deck 100, whereby it undergoes clockwise rotation to collect magnetic tape 90.

Stripper reel 10 includes a hard, circular, cylindrical reel core 20, which is shown clamped by hub 80; reel core 20 desirably has dimensions and design compatible with the core of a normal tape reel for the tape deck 100. Reel core 20 is fixed to backing flange 40, and demountably engages front flange 50 (here shown partially cut away to reveal the interior structures of stripper reel 10). Front flange 50 has keyholes 52, 53 to allow a user-releasable attachment to reel core 20 through screws 22, 23. A resilient tape core 30, advantageously in the form of a hollow circular cylinder, is placed around reel core 20, so that incoming magnetic tape 90 is wound around the resilient tape core. Typically, tape core 30 is press-fitted to reel core 20, and may be conveniently removed and replaced after a period of wear.

In commercial reel-to-reel tape decks for computer data recording, instrumentation tapes, and other high performance applications, the tight packing of magnetic tape onto prior art tape reels presents formidable barriers to the stripping or removal of tape from the reel. In order to provide a uniform tape pack, and prevent cinching and like problems, the tape is subjected to tensile forces typically on the order of ounces. This results in considerable buildup of compressive pressures exerted by the inner tape layers on the reel core. The net compressive force exerted by multiple tape layers is a cumulative effect, which over the first hundred or so wrappings is roughly the sum of the individual forces; additional accumulation of tape 90 results in buildup of compressive forces at a decreasing rate. Inasmuch as typical tape thicknesses are on the order of 1-2 mils., these forces may build to hundred of pounds over several inches accumulation of tape.

By interposing a relatively yielding tape core 30 between reel core 20 and the tape pack 90, the stripper reel 10 dramatically reduces the compressive forces exerted by the pack. Best results are achieved where tape core 30 consists of an elastomeric material having a durometer between 10 and 30, and more preferably between 10 and 20. Most generally, the tape core material should have sufficient "give" to provide the desired reduction in compressive pressures exerted by tape 90, but not so soft as to be vulnerable to physical deterioration. Suitable materials include silicone elastomers, urethanes, fluorocarbons, and other natural and synthetic elastomers. An illustrative material for tape core 30 is Dow Corning Sylgard 186 clear silicone elastomer (Sylgard 186 is a tradename of Dow Corning Corp., Midland, Mich.).

In operation, the tape core 30 lessens the buildup of compressive forces exerted by the tape pack 90 through the compressive deformation of the elastomeric material. It is desirable for this purpose that the tape core 30 have a radial thickness sufficient to provide the requisite deformation or collapse: unduly thin layers may significantly reduce this effect. Advantageously, for most applications, core 30 should have a thickness of at least one-eighth of an inch. A practical upper limit in thickness relates to the region between the outer diameter of flanges 40, 50, and that of core 30, which should provide adequate room to collect a suitable range of tape lengths between the flanges. In contrast, prior art reel cores typically consist of a metal or other relatively hard material having a high modulus of elasticity in compression on the order of $10^6$–$10^7$ P.S.I., so that they are virtually undistorted by the high compressive forces, which may be on the order of hundreds or even thousands of pounds.

FIG. 2 illustrates the removal of a quantity of tape 90 which has been collected on the stripper reel 10. After detaching the reel 10 from mounting hub 80 and taking off the front flange 50, the user may manually grip the tape pack 90 using the finger slots 45 for convenient access to the outer circumference of the pack. Lifting off the pack for disposal of the tape is an almost effortless operation, after which stripper reel 10 may be reused.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims. The apparatus of the present invention is usable in a wide variety of reel-to-reel tape transport applications, and is not limited to particular reel diameters, tape transport specifications, tape widths or thicknesses, or other physical characteristics.

We claim:

1. Magnetic tape stripping apparatus, comprising:
   a hard, reel core of essentially cylindrical form;
   a resilient annular tape core mounted around said reel core and made of elastomeric material with a hardness of between 10 and 30 durameter; and said reel and tape cores being adapted to rotate to collect tape about said tape core wherein collected tape can be more easily stripped from the cores by the compressibility of said tape core.

2. Apparatus as defined in claim 1 wherein the tape core has a hardness of between 10 and 20 durometer.

3. Apparatus as defined in claim 1 wherein the tape core has a radial thickness of at least 0.125 inch.

4. Apparatus as defined in claim 1 wherein the tape core is comprised of a material selected from the group consisting of silicone elastomers, urethanes, and fluorocarbons.

5. Apparatus as defined in claim 1, further comprising a first flange coupled to said tape core and reel core, said flange having a face essentially perpendicular to the axis of said reel core.

6. Apparatus as defined in claim 5, wherein the first flange is permanently fixed to said reel core, further including a second flange demountably coupled to said reel core.

7. A tape stripping device, comprising:
   a hard inner member having a circular cylindrical shape;
   a resilient outer member of hollow circular cylindrical form, coaxially fitted around said inner member, and made of a natural or synthetic elastomer from the class consisting of silicone elastomers, urethanes, and fluorocarbons; and said inner and outer members being adapted to rotate to collect tape about said outer member wherein collected tape can be more easily stripped from the inner and outer members by the compressibility of said outer member.

8. Apparatus as defined in claim 7 wherein the resilient outer member has a hardness of between 10 and 30 durometer.

9. Apparatus as defined in claim 7 wherein the resilient outer member has a hardness of between 10 and 20 durometer.

10. Apparatus as defined in claim 7, further comprising flanges having inner faces perpendicular to the axis of said inner and outer members, wherein said flanges are joined to and straddle the inner and outer members.

11. Apparatus as defined in claim 10 wherein one of said flanges demountably engages the inner member.

* * * * *